UNITED STATES PATENT OFFICE.

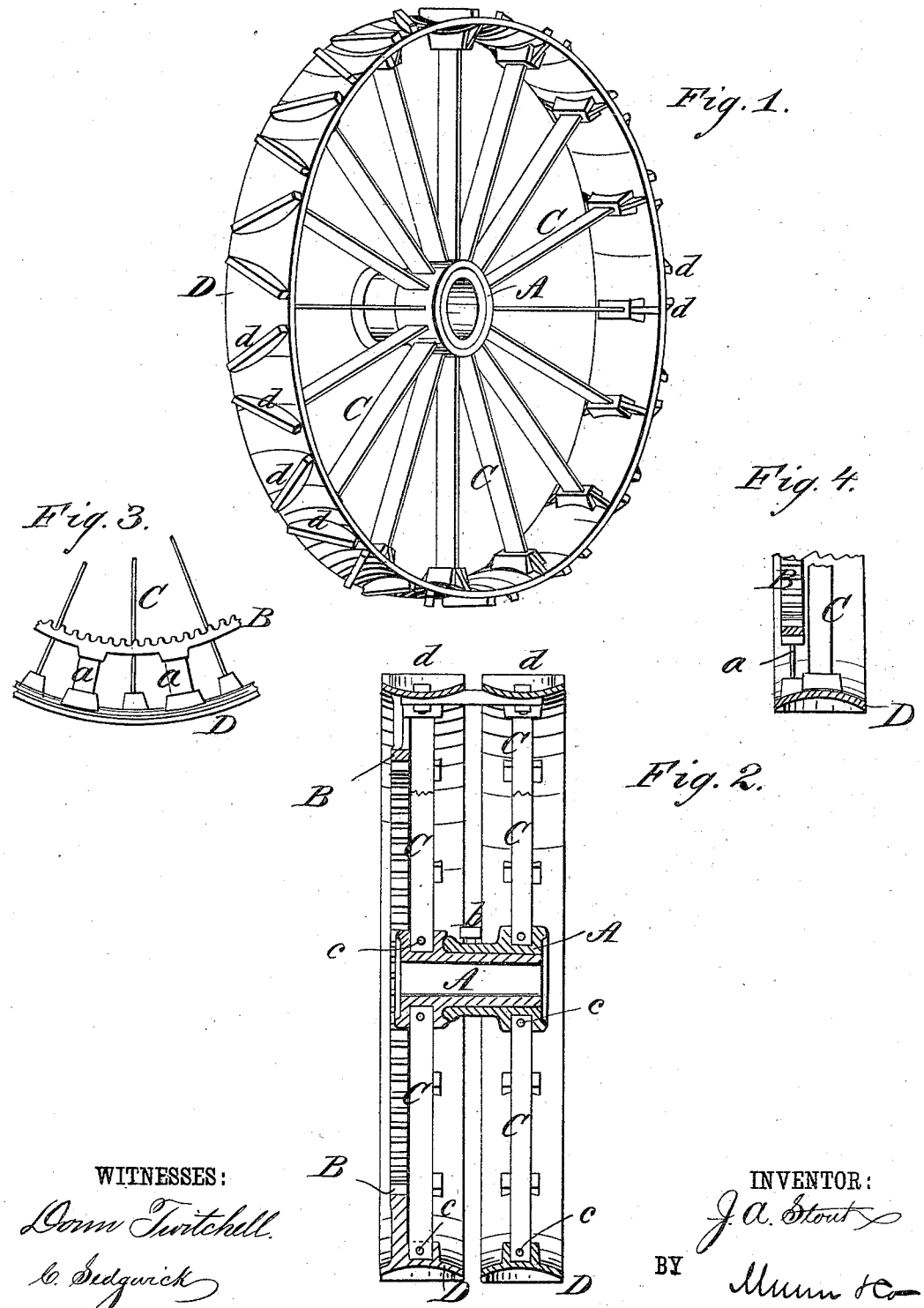

JAMES ANDREW STOUT, OF BELLEVILLE, ILLINOIS, ASSIGNOR TO THE HARRISON MACHINE WORKS, OF SAME PLACE.

TRACTION-WHEEL.

SPECIFICATION forming part of Letters Patent No. 309,417, dated December 16, 1884.

Application filed April 11, 1884. (No model.)

*To all whom it may concern:*

Be it known that I, JAMES A. STOUT, of Belleville, in the county of St. Clair and State of Illinois, have invented certain new and useful Improvements in Driving-Wheels of Traction-Engines, of which the following is a full, clear, and exact description.

This invention consists in a traction-wheel of novel construction, whereby the wheel has an increased pulling or tractive effect secured for it, combines lightness with strength, and reduces the tendency of the wheel to lift the earth or dirt, also in or by which, under a special or double construction of the wheel, the engine is better adapted for working in plowed or soft ground, as in plowing or when traveling over muddy roads, substantially as hereinafter described.

Reference is to be had to the accompanying drawings, forming a part of this specification, in which similar letters of reference indicate corresponding parts in all the figures.

Figure 1 represents a perspective view of the driving-wheel of a traction-engine under a single construction embodying my invention, and Fig. 2 a section taken longitudinally with the axis of a like wheel of double construction. Figs. 3 and 4 are detail views of part of the wheel, showing a modified construction of the same.

A in Fig. 1 is the hub of the wheel, made of cast-iron, and A A in Fig. 2 the hubs of two similarly-constructed wheels, forming a double wheel on each side of the engine, and arranged side by side, with the hub of the outer one of said wheels slipped over a portion of the inner one of said wheels and fastened with one or more set-screws, *b*, and the rims of the duplicate wheels being bolted together in any convenient manner. Both of these wheels, which may or may not have a space between their respective rims, are a counterpart of each other, excepting that only the inner wheel has a spur-gear, B, upon it to receive the necessary driving-power from the motor or engine proper, and such gear, although not shown in Fig. 1, is designed to be similarly attached to the wheel there shown when said wheel is single or not one of the two wheels arranged side by side, it being immaterial in this respect whether the traction-wheel be a single or double one. The spokes C of each of these wheels are of wrought-iron, and are connected with their respective hubs A in the process of casting the latter. Each individual wheel has but one row of these spokes, which are in the same vertical line or plane, or to give greater strength may be set zigzag, and said spokes are made flat, of considerable width, but little thickness, their width running in direction of the axis of the wheel. This construction and arrangement of the spokes, which are also united with the rim as well as with the hub of the wheel in the process of casting, gives all the lateral or side strength required, as well as great lightness and general strength. To prevent said spokes from working loose in the hub and rim of the wheel, there are holes *c* punched in the opposite ends of each spoke before uniting them with the hub and rim of the wheel by casting. These holes give additional bearing-surface to the cast-iron and form an interlocking construction, which prevents all "churning" or working loose of the spokes, the great weight of the engine with its load requiring great strength as regards such connections. The main spur-gear B is also united at one and the same time with the rim and spokes of the wheel during the process of casting the rim or rim and hub. Heretofore these gears have been cast separate from the traction-wheels and been bolted to the latter, which is an expensive mode of construction, inasmuch as it involves extra labor in molding, planing the adjacent surfaces of the two wheels, and boring holes and making bolts to secure them together, and in putting them together. Said main spur or gear wheels are made of larger diameter than usual, as also the traction-wheels, to give an enlarged tractive effect. The rim D of each wheel, whether two of such arranged side by side or only one be used, is of concave form on its outer periphery and convex on its inner periphery. The outer surface, in being made concave, presents two salient edges to come in contact with the ground, and, compressing the earth, as it were, between them, secures a much greater tractive effect than does a convex tread or outer surface of convex form as heretofore used. It also is a stronger form of construction, which allows of the wheels being made lighter. Furthermore, the rim D, constructed concave on its exterior and convex on its interior, has greatly the advantage over a wheel the rim of which is of reverse construction as regards its travel over muddy roads, inasmuch as it will not catch and carry up mud to interfere with or drop into the gearing, that not only causes excessive wear of the gearing, but makes the engine labor hard and produces great wear and tear generally, requiring more fuel, water, and time to do a certain amount of work. The convexity of the inner surface of the wheel will cause any mud that may be only slightly lifted to quickly drop from the edges of the wheel, instead of being carried up to fall into the gearing, as where the wheel is concave on its interior surface. The concave construction of the exterior of the rim, too, will give the wheel a better hold in traveling over hill-sides and other places, or on icy ground. Upon the outer concave surface of the rim of each traction-wheel are diagonally-arranged ribs *d*, of reverse obliquity for each succeeding rib, so as to present an almost continuous zigzag arrangement all around the wheel. This disposition of the ribs, which have straight outer margins, gives a much more uniform and regular tractive effect than does a parallel arrangement of the ribs.

Instead of uniting the main spur-gear at one and the same time directly with both the rim and spokes of the wheel during the process of casting, it may be cast to the rim D alone by short wrought-iron arms *a*, arranged intermediately of the spokes C, as shown in Figs. 3 and 4 of the drawings, these arms *a* being of greater width than thickness, and being arranged with their width in a plane transverse to the axis of the wheel.

Having thus described my invention, I claim as new and desire to secure by Letters Patent—

1. A traction-wheel having its rim of concave form on its outer surface and convex form on its inner surface, said concave and convex surfaces extending from edge to edge, and said wheel being provided with a driving spur or annular gear wheel, substantially as set forth.

2. A traction-wheel formed with a convex inner surface and a concave outer surface, and reversely-inclined consecutive ribs *d*, disconnected at their ends and having straight flat faces, substantially as set forth.

JAMES ANDREW STOUT.

Witnesses:
HENRY SPRING,
LEE HARRISON.